US007866025B2

(12) United States Patent  (10) Patent No.: US 7,866,025 B2
James et al.  (45) Date of Patent: *Jan. 11, 2011

(54) ROTARY WING AIRCRAFT ROD END AND METHOD OF MAKING A HELICOPTER VEHICLE ROD END WITH A PRECOCKED ORIENTATION

(75) Inventors: Frank O. James, Girard, PA (US); Christopher F. Rajecki, McKean, PA (US)

(73) Assignee: LORD Corporation, Cary, NC (US)

( * ) Notice: Subject to any disclaimer, the term of this patent is extended or adjusted under 35 U.S.C. 154(b) by 215 days.

This patent is subject to a terminal disclaimer.

(21) Appl. No.: 11/861,866

(22) Filed: Sep. 26, 2007

(65) Prior Publication Data

US 2008/0247690 A1    Oct. 9, 2008

Related U.S. Application Data

(63) Continuation of application No. 11/036,737, filed on Jan. 14, 2005, now Pat. No. 7,290,985.

(60) Provisional application No. 60/536,672, filed on Jan. 15, 2004.

(51) Int. Cl.
 *B23P 25/00* (2006.01)
(52) U.S. Cl. .................. 29/458; 29/527.1; 29/527.2; 384/221; 416/134 A
(58) Field of Classification Search .................. 416/133, 416/134 A, 134 R; 244/17.25, 17.27; 384/192, 384/202, 216, 221; 29/527.1, 527.2
See application file for complete search history.

(56) References Cited

U.S. PATENT DOCUMENTS 3,759,632 A * 9/1973 Rybicki .................. 416/134 R (Continued)

FOREIGN PATENT DOCUMENTS

DE    3613123    10/1987

(Continued)

OTHER PUBLICATIONS

International Search Report and Written Opinion for PCT/US2005/001250.

(Continued)

*Primary Examiner*—Edward Look
*Assistant Examiner*—Ryan H Ellis
(74) *Attorney, Agent, or Firm*—Edward F. Murphy

(57) ABSTRACT

The invention provides a rotary wing aircraft helicopter vehicle rod end and method of making a rod end. The rotary wing aircraft rod end includes a nonelastomeric inner member having an outer bonding surface segment and an axial bore with a center bore axis, a nonelastomeric outer member having an inner bonding surface segment and an axial bore center bore axis, and molded in place alternating elastomeric shims and nonelastomeric shims connecting the nonelastomeric inner member to the nonelastomeric outer member. The rod end includes a first inner elastomeric shim bonded to the nonelastomeric inner member outer bonding surface segment and to a first inner nonelastomeric shim and a second outer elastomeric shim bonded to the nonelastomeric outer member inner bonding surface segment and to a second outer nonelastomeric shim. The nonelastomeric inner member has a molded misalignment rotary wing aircraft rod end orientation with the outer nonelastomeric outer member.

13 Claims, 15 Drawing Sheets

U.S. PATENT DOCUMENTS

| | | | |
|---|---|---|---|
| 3,764,230 A | 10/1973 | Rybicki et al. | |
| 3,881,711 A | 5/1975 | Lemaitre | |
| 4,634,108 A | 1/1987 | Munch | |
| 4,714,450 A | 12/1987 | Byrnes et al. | |
| 5,145,321 A | 9/1992 | Flux et al. | |
| 5,160,243 A | 11/1992 | Herzner et al. | |
| 5,240,375 A | 8/1993 | Wayte | |
| 5,460,487 A | 10/1995 | Schmaling et al. | |
| 5,842,677 A | 12/1998 | Sweeney et al. | |
| 5,902,050 A | 5/1999 | Balczun et al. | |
| 5,915,842 A | 6/1999 | Redinger | |
| 6,098,966 A | 8/2000 | Latvis et al. | |
| 6,328,293 B1 | 12/2001 | Olsen | |
| 6,726,394 B2 | 4/2004 | Garnier et al. | |
| 6,848,886 B2 * | 2/2005 | Schmaling et al. | 416/134 A |
| 7,290,985 B2 * | 11/2007 | James et al. | 416/1 |
| 2003/0098565 A1 | 5/2003 | Mosler | |

FOREIGN PATENT DOCUMENTS

| | | |
|---|---|---|
| GB | 2033533 | 5/1980 |
| JP | 10047433 | 2/1998 |
| JP | 2000326714 | 11/2000 |

OTHER PUBLICATIONS

Alinabal, Motion Transfer Devices, 2002, pp. 1-3, published by Alinabal, USA.

Rod End Supply, 2004, pp. 2-24, published by Rod End Supply, Olathe Kansas, USA.

Lord Corporation, Dynaflex Elastomeric Rod Ends, 1998, published by Lord Corporation, Erie, PA USA.

Alinabal, Rod Ends, 1997, pp. 1-4, published by Alinabal, USA.

Tom Miller, "Rod Ends Support Aircraft Equipment and Reduce Cabin Noise", published by Endine, Orchard Park, USA.

Lord Corporation, Elastomeric "HCL" Rod End Bearings, 1982, Lord Corporation, Erie, PA USA.

Lord Corporation, Rotary Wing Aircraft Products, 1994, pp. 2-10, 1994, Lord Corporation, Erie, PA USA.

R.L. Hudson, Custom-Molded Rubber, 2003, pp. 1-2.

Saint-Gobain Performance Plastics, Molding, 2002, pp. 1-3, USA.

Office Action date Dec. 20, 2006 from U.S. Appl. No. 11/036,737, now U.S. Patent No. 7,290,985.

Amendment dated May 21, 2007 from U.S. Appl. No. 11/036,737, now U.S. Patent No. 7,290,985.

* cited by examiner

ROTARY WING AIRCRAFT ROD END AND METHOD OF MAKING A HELICOPTER VEHICLE ROD END WITH A PRECOCKED ORIENTATION

CROSS REFERENCE

This application is a Continuation of U.S. patent application Ser. No. 11/036,737 filed on Jan. 14, 2005, now U.S. Pat. No. 7,290,985 which claims the benefit of U.S. Provisional Patent Application No. 60/536,672 filed on Jan. 15, 2004, both of which are herein claimed and incorporated by reference.

FIELD OF THE INVENTION

The invention relates to a rotary wing aircraft rod end and a method of making a rotary wing vehicle rod end. More particularly the invention relates to helicopter rod ends and methods for making rod ends with precooked orientations.

BACKGROUND OF THE INVENTION

There is a need for an effective and economical means for making rotary wing aircraft rod ends for helicopter applications and use. There is a need for economically feasible rotary wing aircraft rod ends with precooked orientations. There is a need for a robust system and method of making a vehicle rod end with a precooked orientation.

SUMMARY

In an embodiment the invention includes a rotary wing aircraft helicopter vehicle rod end. The rotary wing aircraft rod end is comprised of a nonelastomeric inner member having an outer bonding surface segment and an axial bore with a center bore axis, a nonelastomeric outer member having an inner bonding surface segment and an axial bore center bore axis, and a plurality of molded in place alternating elastomeric shims and nonelastomeric shims connecting the nonelastomeric inner member to the nonelastomeric outer member including a first inner elastomeric shim bonded to the nonelastomeric inner member outer bonding surface segment and to a first inner nonelastomeric shim and a second outer elastomeric shim bonded to the nonelastomeric outer member inner bonding surface segment and to a second outer nonelastomeric shim wherein the nonelastomeric inner member has a molded misalignment rotary wing aircraft rod end orientation with the outer nonelastomeric outer member, with the nonelastomeric inner member axial bore center bore axis nonparallel with the nonelastomeric outer member axial bore center bore axis.

In an embodiment the invention includes a method of making a vehicular rod end. The method comprises providing a nonelastomeric inner member having an outer bonding surface segment and an axial bore with a center bore axis, providing a nonelastomeric outer member having an inner bonding surface segment and an axial bore with an axial bore center bore axis, providing a plurality of nonelastomeric shims, including a first inner nonelastomeric shim, and a second outer nonelastomeric shim, providing a rod end mold for receiving the nonelastomeric inner member and the nonelastomeric outer member with the nonelastomeric inner member held in the nonelastomeric outer member axial bore with the nonelastomeric shims progressively disposed between the nonelastomeric outer member and the nonelastomeric inner member, providing a curable elastomer, molding the nonelastomeric inner member to the nonelastomeric outer member with the elastomer under an applied elastomer pressure inside the mold and curing the elastomer wherein the nonelastomeric inner member has a molded misalignment orientation with the outer nonelastomeric outer member, with the nonelastomeric inner member axial bore center bore axis nonparallel with the nonelastomeric outer member axial bore center bore axis.

In an embodiment the invention includes a rod end comprising a nonelastomeric inner member having an outer bonding surface segment and an axial bore with a center bore axis. The rod end includes a nonelastomeric outer member having an inner bonding surface segment and an axial bore center bore axis. The rod end includes a plurality of molded in place alternating elastomeric shims and nonelastomeric shims connecting the nonelastomeric inner member to the nonelastomeric outer member. The rod end includes a first inner elastomeric shim bonded to the nonelastomeric inner member outer bonding surface segment and to a first inner nonelastomeric shim and a second outer elastomeric shim bonded to the nonelastomeric outer member inner bonding surface segment and to a second outer nonelastomeric shim wherein the nonelastomeric inner member has an uninstalled molded misalignment orientation with the outer nonelastomeric outer member, with the nonelastomeric inner member axial bore center bore axis nonparallel with the nonelastomeric outer member axial bore center bore axis. Preferably the inner member axial bore center bore axis is nonnormal to the rod shaft axis of the rod end.

In an embodiment the invention includes a method of making a rod end. The method includes providing a nonelastomeric inner member having an outer bonding surface segment and an axial bore with a center bore axis, providing a nonelastomeric outer member having an inner bonding surface segment and an axial bore with an axial bore center bore axis, providing a plurality of elastomeric shims and nonelastomeric shims, including a first inner elastomeric shim, a first inner nonelastomeric shim, a second outer elastomeric shim, and a second outer nonelastomeric shim, providing a rod end mold for receiving the nonelastomeric inner member and the nonelastomeric outer member with the nonelastomeric inner member held in the nonelastomeric outer member axial bore, molding the nonelastomeric inner member to the nonelastomeric outer member with the plurality of elastomeric shims and nonelastomeric shims wherein the nonelastomeric inner member has a molded in place misalignment orientation with the outer nonelastomeric outer member with the nonelastomeric inner member axial bore center bore axis nonparallel with the nonelastomeric outer member axial bore center bore axis.

In an embodiment the invention includes a method of making a rod end. The method comprises providing a nonelastomeric inner member having an outer bonding surface segment and an axial bore with a center bore axis, providing a nonelastomeric outer member having an inner bonding surface segment and an axial bore with an axial bore center bore axis, providing a plurality of shims including a first inner shim and a second outer shim, providing a rod end mold for receiving the nonelastomeric inner member and the nonelastomeric outer member with the nonelastomeric inner member held in the nonelastomeric outer member axial bore, molding the nonelastomeric inner member to the nonelastomeric outer member with the plurality of shims there between wherein the nonelastomeric inner member has a molded in place misalignment orientation with the outer nonelastomeric outer member with the nonelastomeric inner member axial bore center bore axis nonparallel with the nonelastomeric outer member axial bore center bore axis.

In an embodiment the invention includes a method of making a rod end. The method includes providing a nonelastomeric inner member having an outer bonding surface segment and an axial bore with a center bore axis, providing a nonelastomeric outer member having an inner bonding surface segment and an axial bore with an axial bore center bore axis, providing at least one shim, providing a rod end mold for receiving said nonelastomeric inner member and said nonelastomeric outer member with said nonelastomeric inner member held in said nonelastomeric outer member axial bore, molding said nonelastomeric inner member to said nonelastomeric outer member with an elastomer with said at least one shim between said nonelastomeric inner member and said nonelastomeric outer member wherein said nonelastomeric inner member has a molded in place misalignment orientation with the outer nonelastomeric outer member with the nonelastomeric inner member axial bore center bore axis nonparallel with the nonelastomeric outer member axial bore center bore axis.

In an embodiment the invention includes a method of making a rod end. The method includes providing a nonelastomeric inner member having an outer bonding surface segment and an axial bore with a center bore axis, providing a nonelastomeric outer member having an inner bonding surface segment and an axial bore with an axial bore center bore axis, providing a rod end mold for receiving said nonelastomeric inner member and said nonelastomeric outer member with said nonelastomeric inner member held in said nonelastomeric outer member axial bore, molding said nonelastomeric inner member to said nonelastomeric outer member with an elastomer wherein said nonelastomeric inner member has a molded in place misalignment orientation with the outer nonelastomeric outer member with the nonelastomeric inner member axial bore center bore axis nonparallel with the nonelastomeric outer member axial bore center bore axis.

In an embodiment the invention includes a rod end comprising a nonelastomeric inner member having an outer bonding surface segment and an axial bore with a center bore axis, a nonelastomeric outer member having an inner bonding surface segment and an axial bore center bore axis, and at least one nonelastomeric shim between said nonelastomeric inner member and said nonelastomeric outer member, and an elastomer bonded to the nonelastomeric inner member outer bonding surface segment and to the nonelastomeric outer member inner bonding surface segment wherein said nonelastomeric inner member has a molded misalignment orientation with the outer nonelastomeric outer member with the nonelastomeric inner member axial bore center bore axis nonparallel with the nonelastomeric outer member axial bore center bore axis.

In an embodiment the invention includes a rod end comprising a nonelastomeric inner member having an outer bonding surface segment and an axial bore with a center bore axis, a nonelastomeric outer member having an inner bonding surface segment and an axial bore center bore axis, and an elastomer bonded to the nonelastomeric inner member outer bonding surface segment and to the nonelastomeric outer member inner bonding surface segment wherein said nonelastomeric inner member has a molded misalignment orientation with the outer nonelastomeric outer member with the nonelastomeric inner member axial bore center bore axis nonparallel with the nonelastomeric outer member axial bore center bore axis.

It is to be understood that both the foregoing general description and the following detailed description are exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention and together with the description serve to explain the principals and operation of the invention.

DETAILED DESCRIPTION OF THE PREFERRED EMBODIMENTS

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

Reference will now be made in detail to the preferred embodiments of the invention, examples of which are illustrated in the accompanying drawings.

Figure 1:
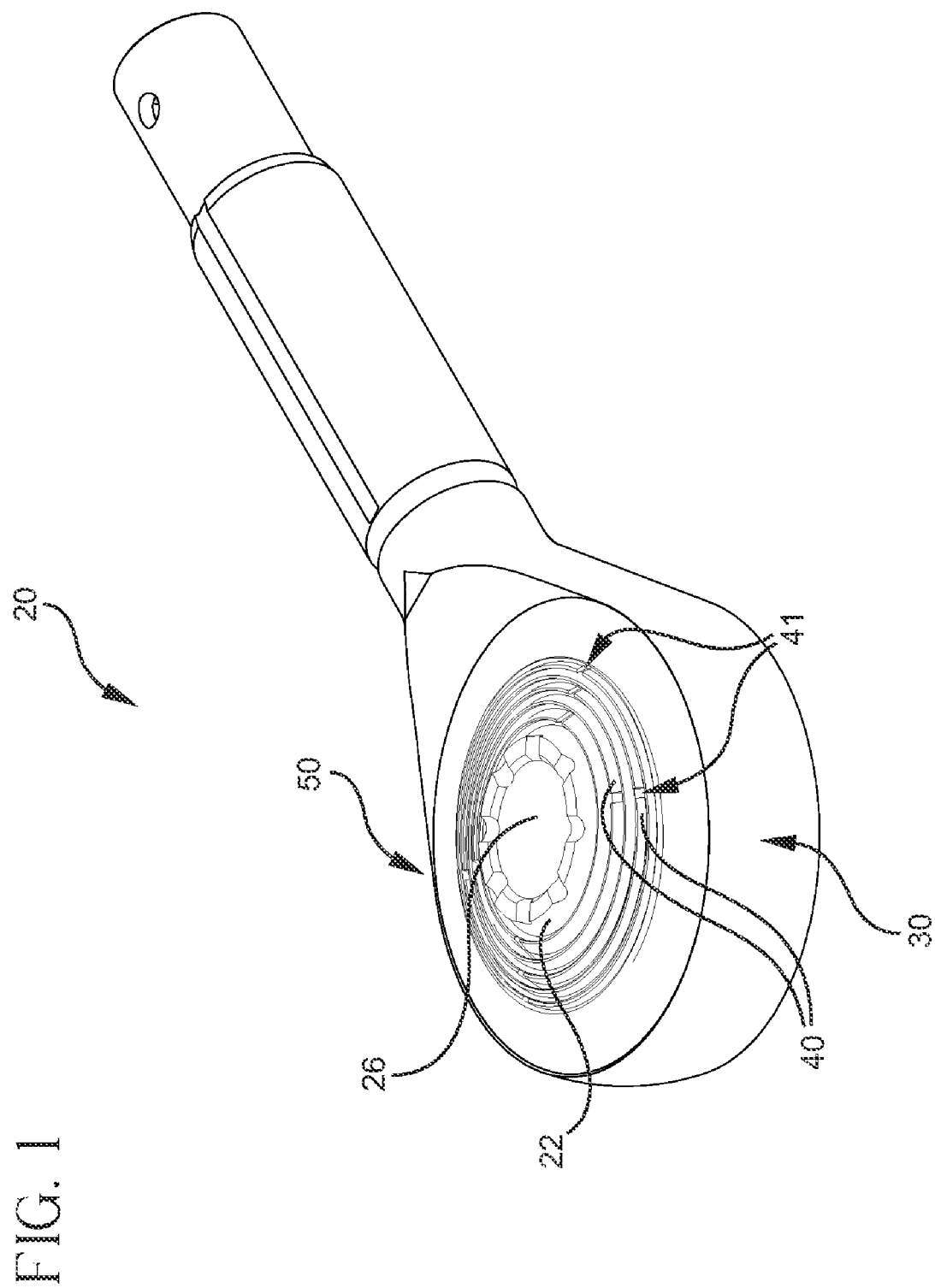
FIG. 1 shows a view of a rod end.
Figure 2:
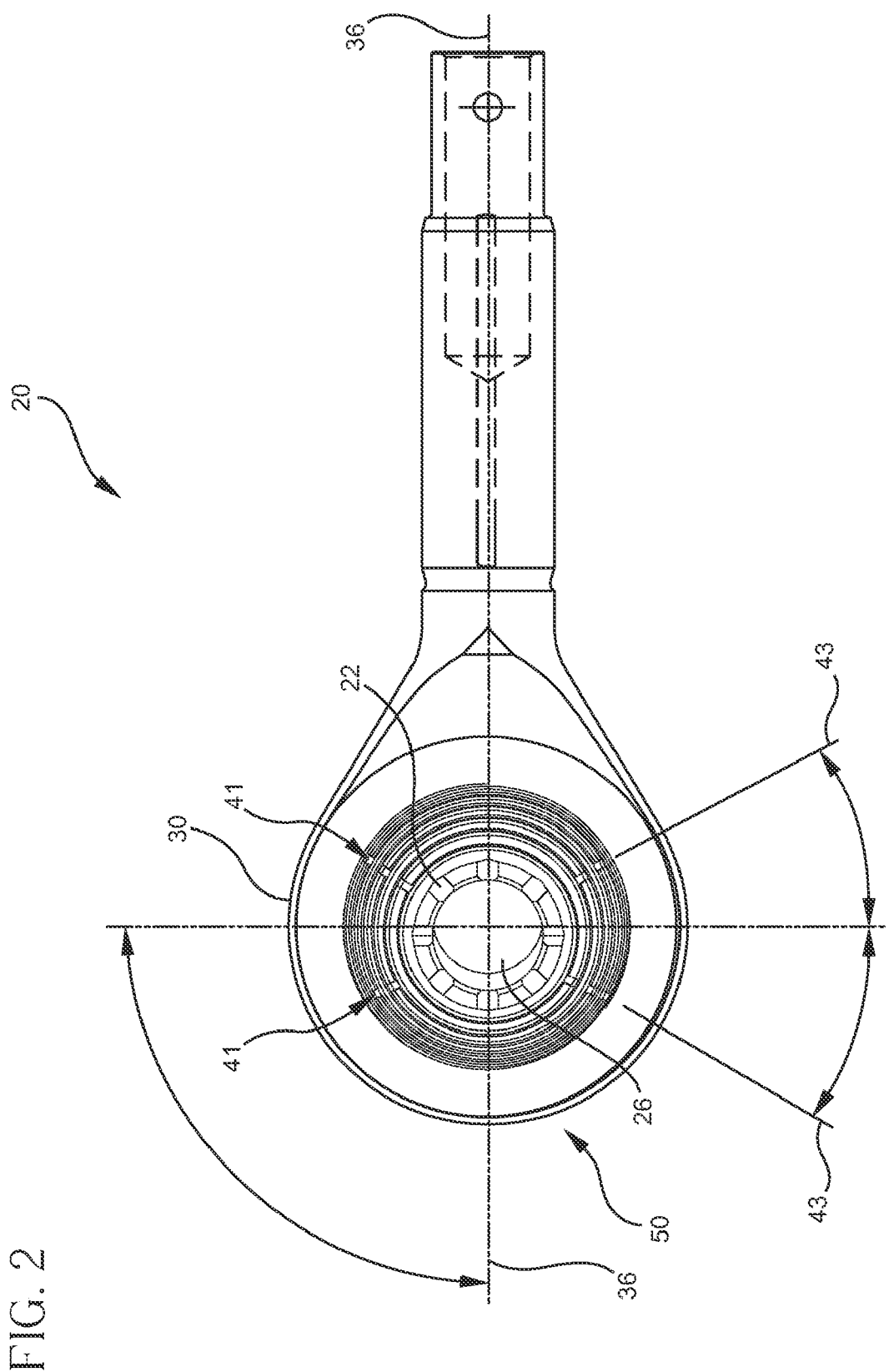
FIG. 2 shows a view of a rod end.
Figure 3:
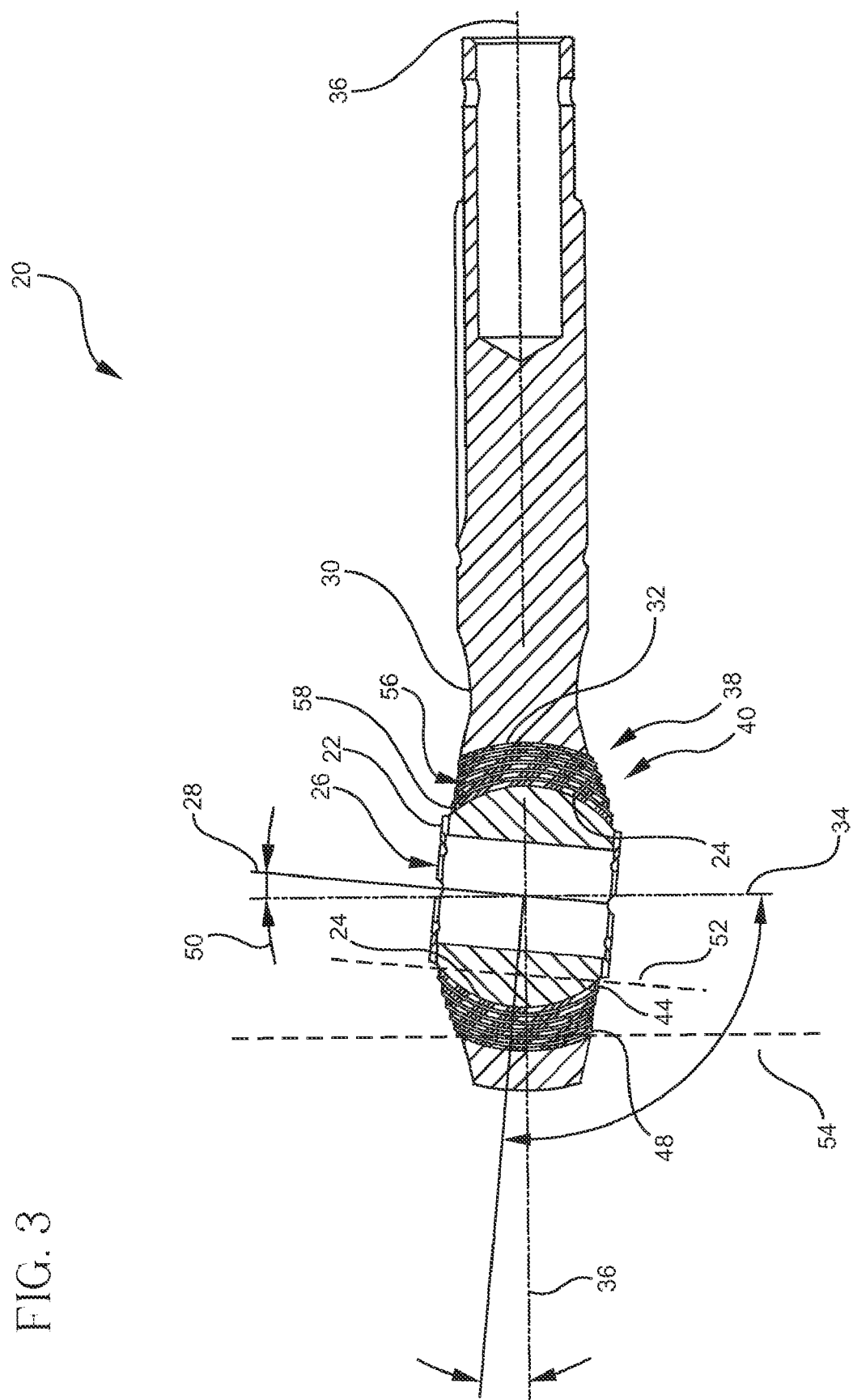
FIG. 3 shows a cross section view of a rod end.

FIGS. 1-3 show a precooked rod end 20. The precooked rod end 20 includes a nonelastomeric outer member 30 and a nonelastomeric inner member 22 having a precooked orientation within the outer member 30. Preferably the inner member and its axial bore 26 have a precooked orientation relative to the outer member 30 with elastomeric shims 38 and nonelastomeric shims 40 between the inner member and the outer member.

In an embodiment the invention includes rod end 20 with nonelastomeric inner member 22 having an outer bonding surface segment 24 and an axial bore 26 with a center bore axis 28. The nonelastomeric outer member 30 has an inner bonding surface segment 32 and an axial bore center bore axis 34. Molded in place alternating elastomeric shims 38 and nonelastomeric shims 40 connect the nonelastomeric inner member 22 to the nonelastomeric outer member 30. The molded in place shims include a first inner elastomeric shim 42 bonded to the nonelastomeric inner member outer bonding surface segment 24 and to a first inner nonelastomeric shim 44 and a second outer elastomeric shim 46 bonded to the nonelastomeric outer member inner bonding surface segment 32 and to a second outer nonelastomeric shim 48 wherein the nonelastomeric inner member 22 has an uninstalled molded misalignment orientation 50 with the outer nonelastomeric outer member 30 with the nonelastomeric inner member axial bore center bore axis 28 nonparallel with the nonelastomeric outer member axial bore center bore axis 34. Preferably the inner member 22 is a nonextensible metal inner member 22. Preferably the inner member outer bonding surface segment 24 is a spherical surface segment 24. Preferably the outer member 30 is a nonextensible metal outer member 30. Preferably the outer member inner bonding surface segment 32 is a spherical surface segment 32. Preferably the axial bore center bore axis 34 is normal to the rod shaft axis 36. Preferably the nonelastomeric shims 40 are nonextensible metal shims 40, preferably with the shims 40 comprised of spherical shell segments, most preferably split spherical shell halves 39 separated by shim split divisions 41 with adjacent shims 40 having their spherical shell half split divisions 41 in a clocked nonoverlapping orientation 43. The rod end 20 has an uninstalled molded misalignment orientation 50 in that the misalignment is molded into place with the misalignment existing prior to installation in its targeted application, preferably with the inner member axial bore center bore axis 28 nonnormal to the rod shaft axis 36, with the axes intersecting within the inner member. Preferably the first inner nonelastomeric shim 44 has a precooking orientation angle 52 with the nonelastomeric outer member axial bore center bore axis 34. More preferably the second outer nonelastomeric shim 48 has a precooking orientation angle 54 with the nonelastomeric outer member axial bore center bore axis 34, with the first inner nonelastomeric shim precooking orientation angle 52 greater than the second outer nonelastomeric shim precooking orientation angle 54, most preferably with a progressive cocking of the shims 40 from the outer to the inner nonelastomeric member. Preferably the shims 40 are progressively cocking shims with at least a half degree of cocking orientation per shim. Preferably the shims 40 are progressively cocking shims with less than five degrees per shim. Preferably the misalignment angle orientation 50 of the inner member 22 is greater than one degree between the nonelastomeric inner member axial bore center bore axis 28 and the nonelastomeric outer member axial bore center bore axis 34, more preferably in a range of 2-20 degrees, more preferably >2 degrees, more preferably in a range of 3-15 degrees, preferably 4-8, preferably 5±3, preferably 5±2, preferably 5±1. In preferred embodiments the rod end 20 has a plurality of alternating elastomeric and nonelastomeric shims and preferably includes a third nonelastomeric shim 40 between the first inner nonelastomeric shim 44 and the second outer nonelastomeric shim 48, preferably at least a fourth nonelastomeric shim 40 between the first and second shims, preferably at least a fifth nonelastomeric shim 40 between the first and second shims, preferably at least a sixth nonelastomeric shim 40 between the first and second shims, and preferably a seventh nonelastomeric shim 40. Preferably the elastomeric shims 38 are contained between the nonelastomeric inner member 22, the nonelastomeric outer member 30, and the nonelastomeric shims 40. Preferably the elastomer 56 does not extend beyond the edges of shims 40, the edges of the members 22 and 30, preferably with the elastomeric shims 38 having a nonextending outer surface 58 between shims 40 and inner and outer members 22 and 30.

Figure 4:
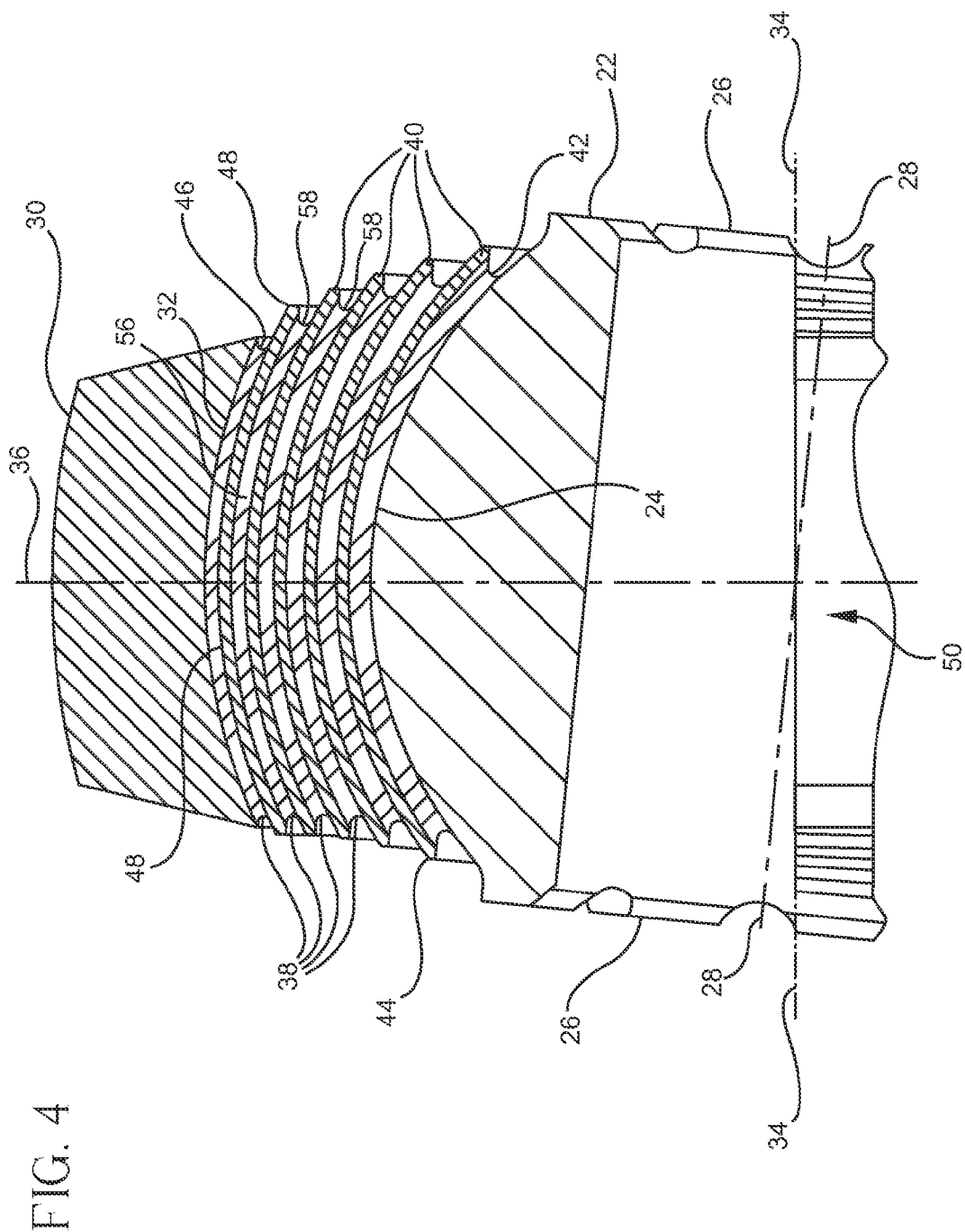
FIG. 4 shows a partial cross section view of a rod end with the rod end inner member and outer member.
Figure 5:
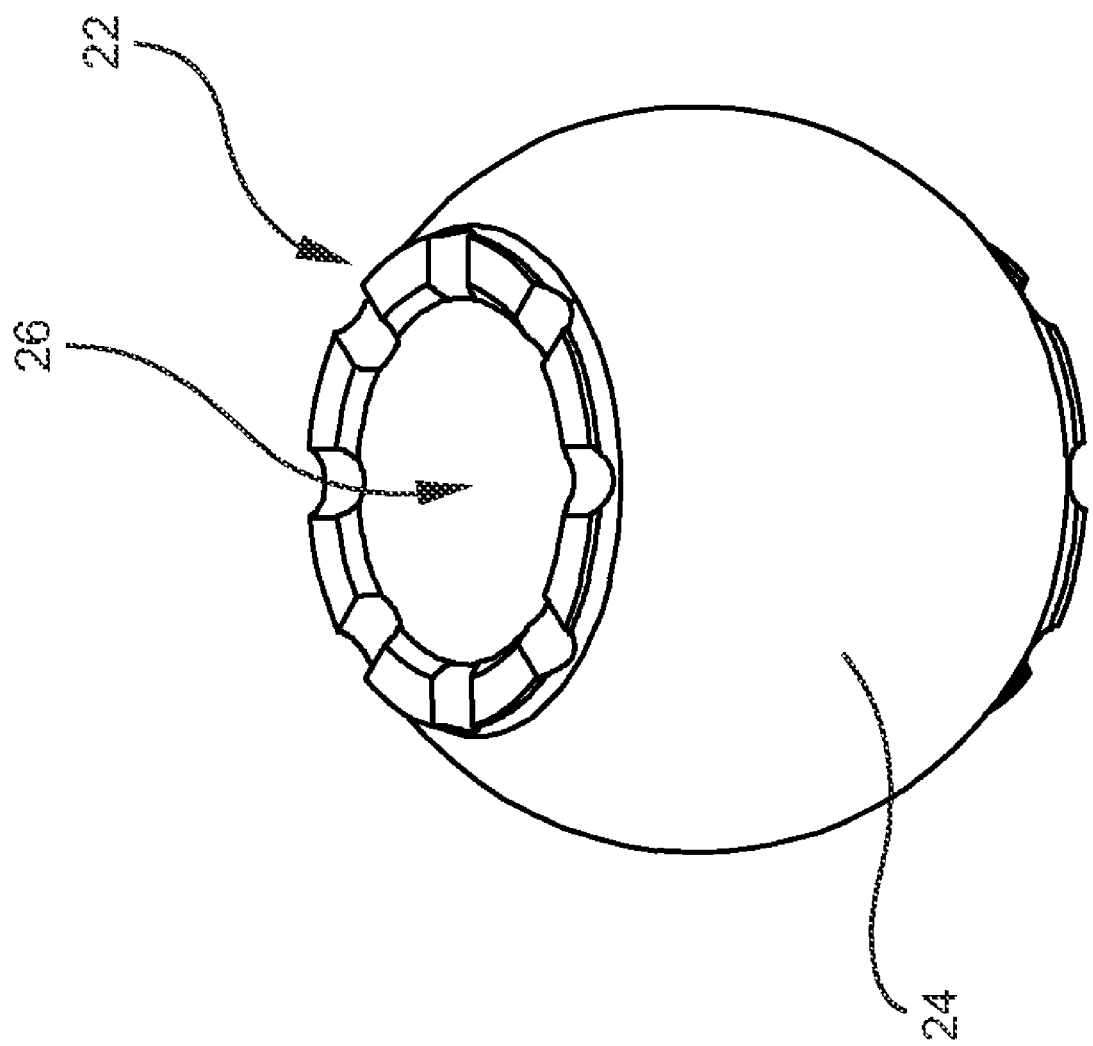
FIG. 5 shows a view of a rod end inner member.
Figure 6:
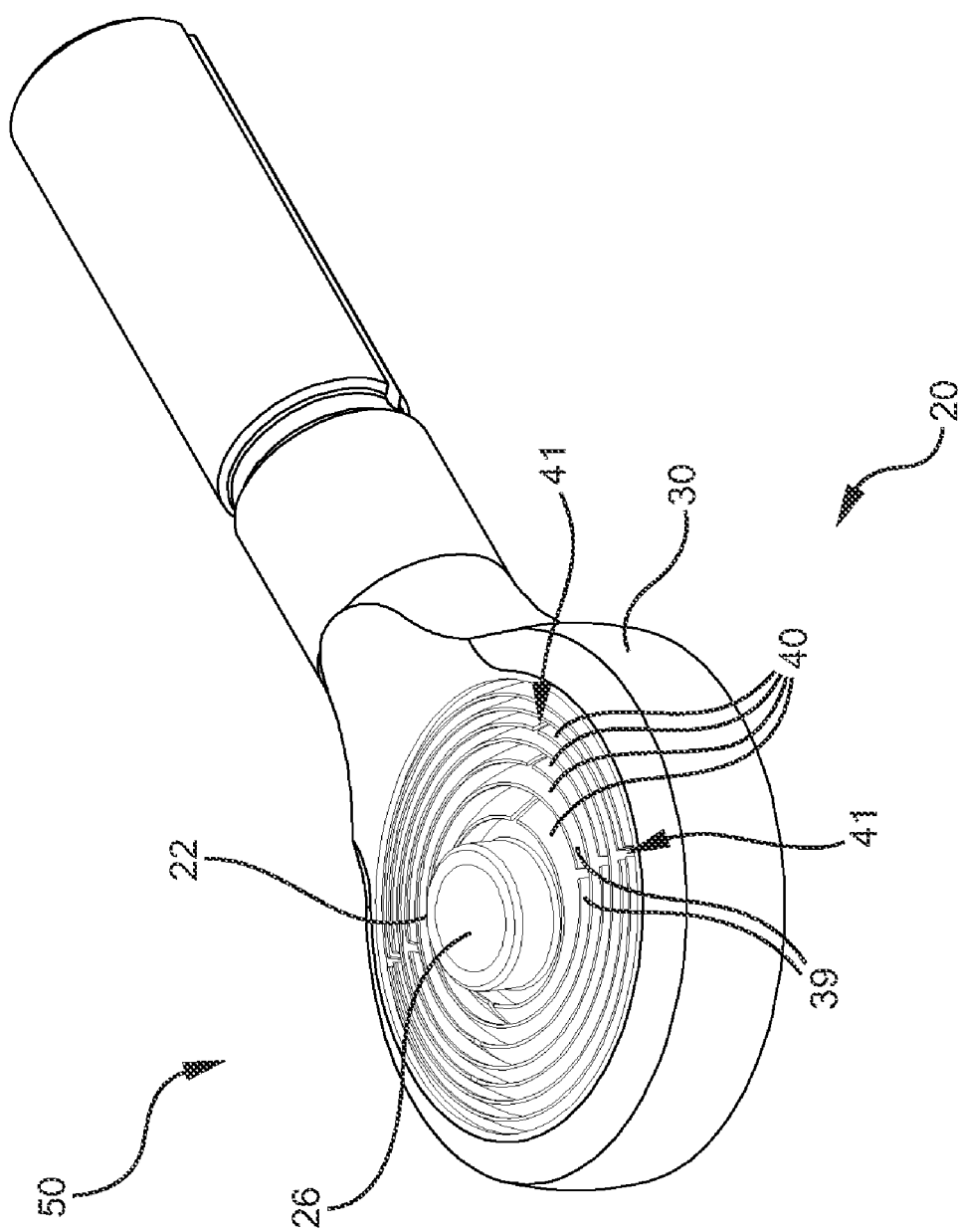
FIG. 6 shows a view of a rod end.
Figure 7:
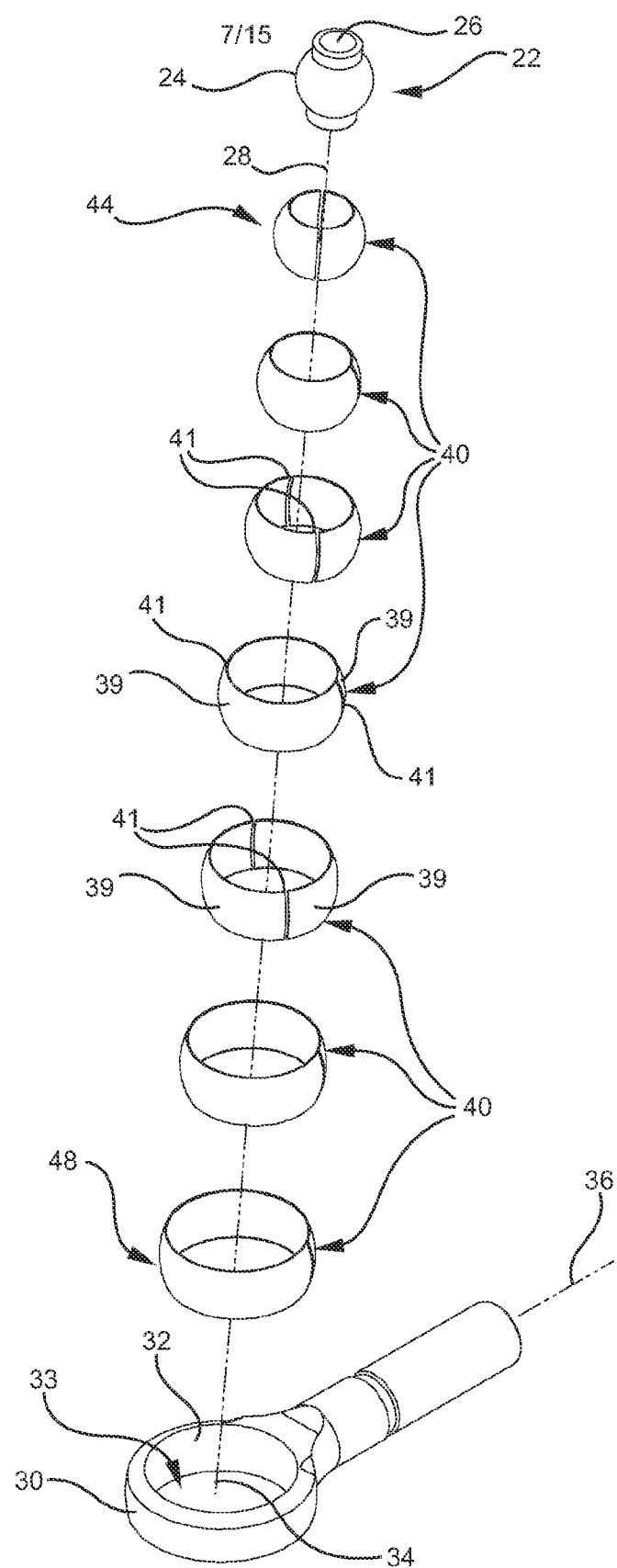
FIG. 7 shows an exploded view of a rod end with the rod end outer member, shims, and inner member.
Figure 8:
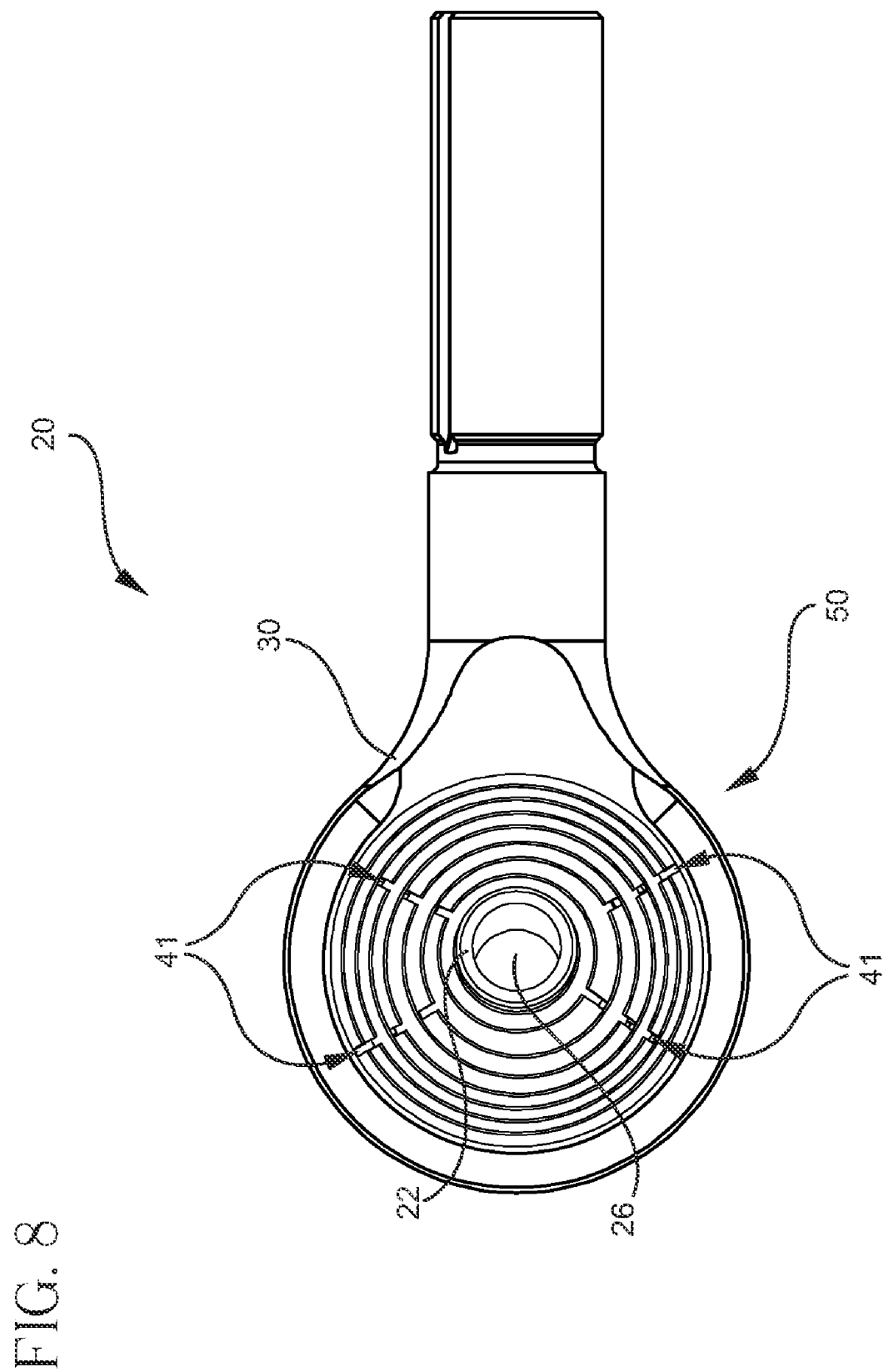
FIG. 8 shows a view of a rod end.
Figure 9:
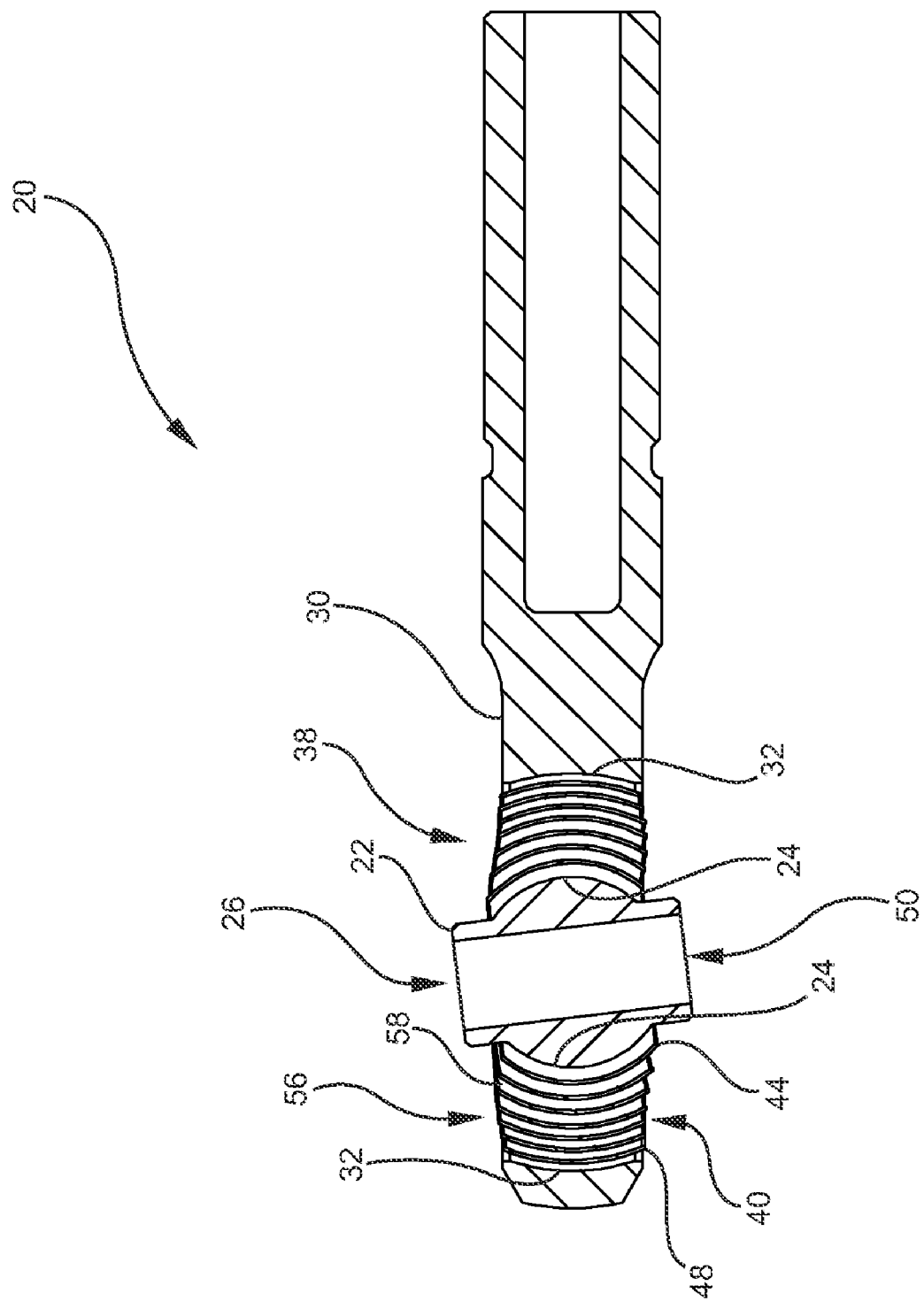
FIG. 9 shows a cross section view of a rod end.
Figure 10:
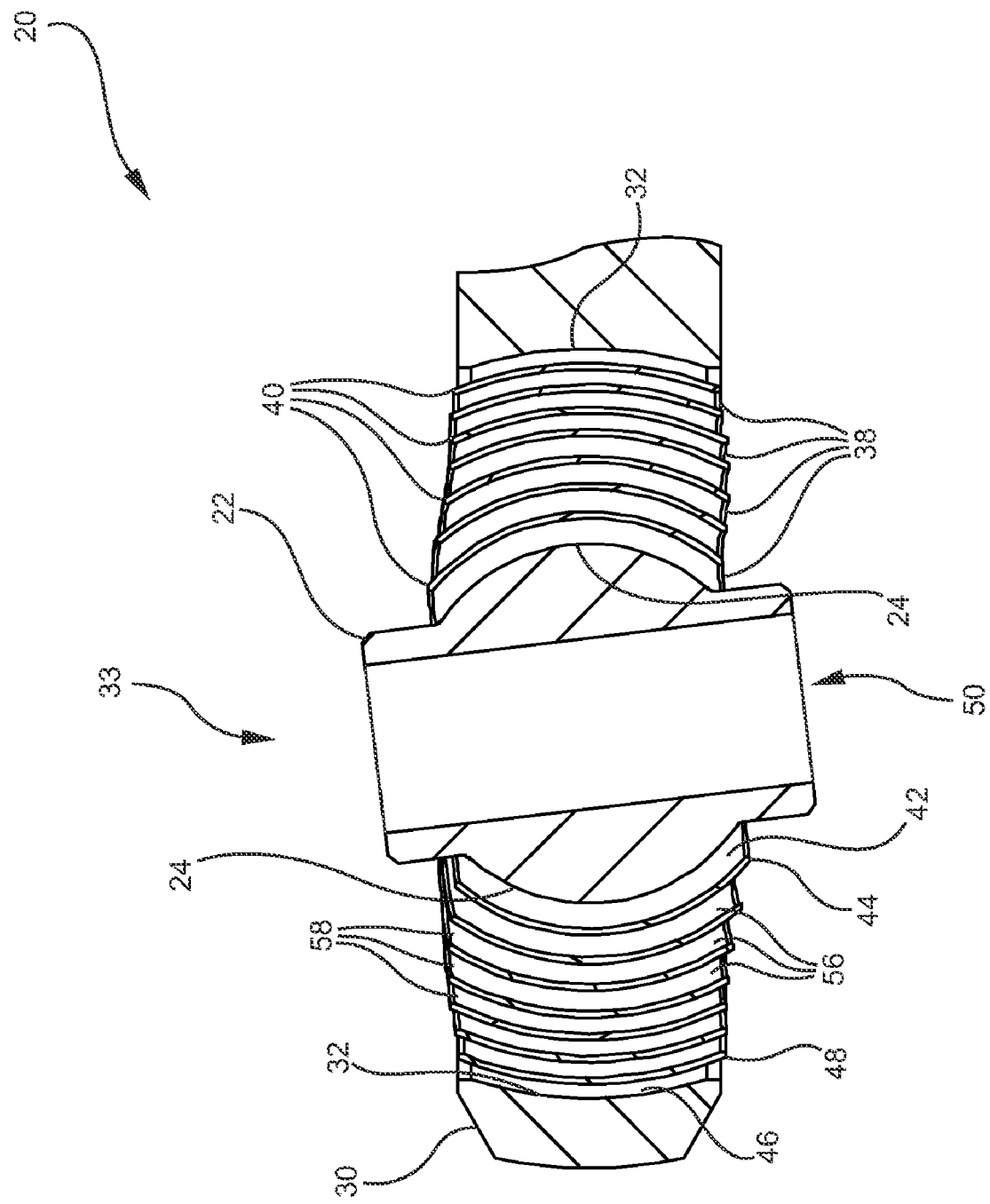
FIG. 10 shows a cross section view of a rod end with the rod end inner member, shims and outer member.
Figure 11:
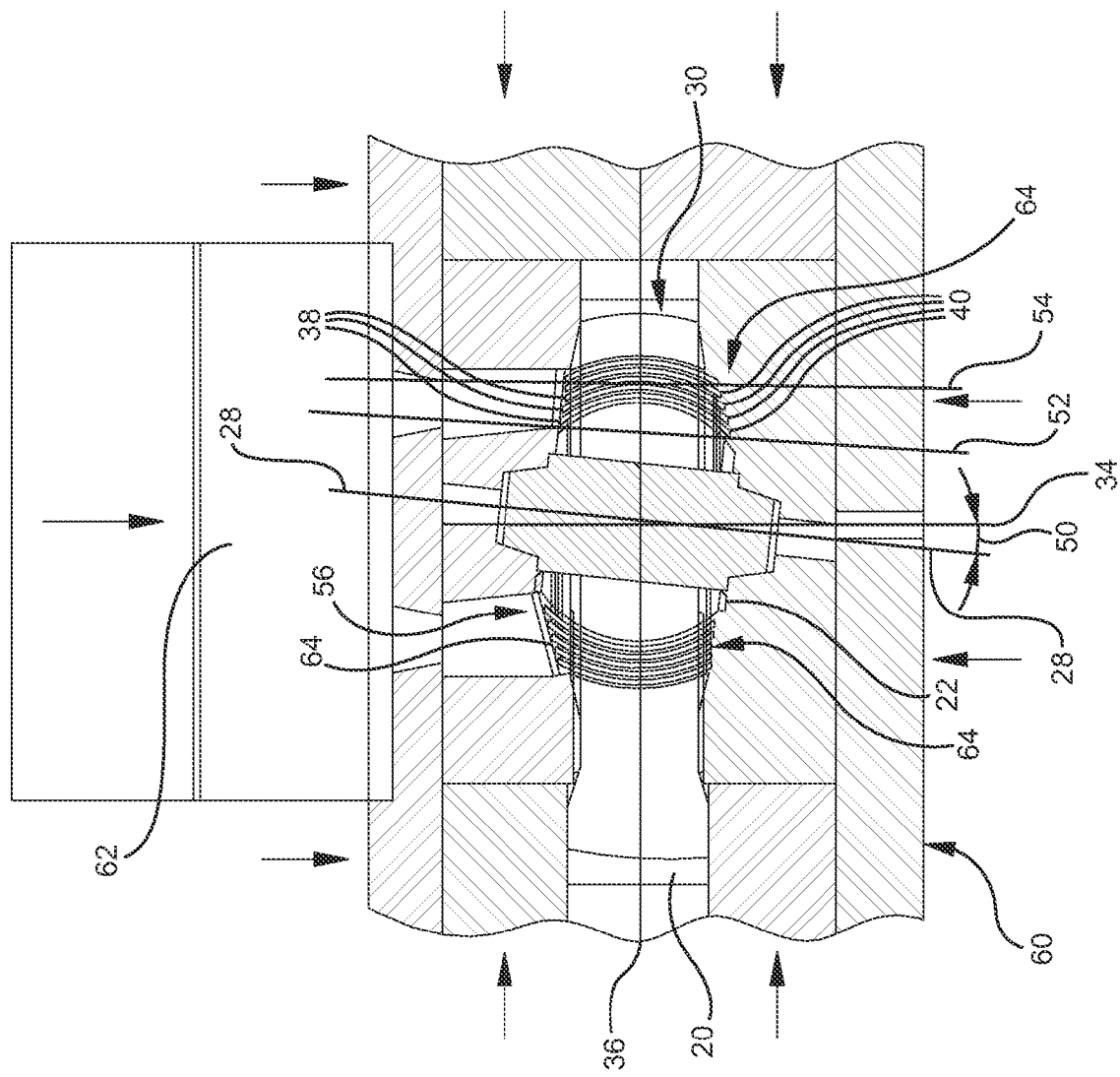
FIG. 11 shows a method of making a rod end in a mold.
Figure 12:
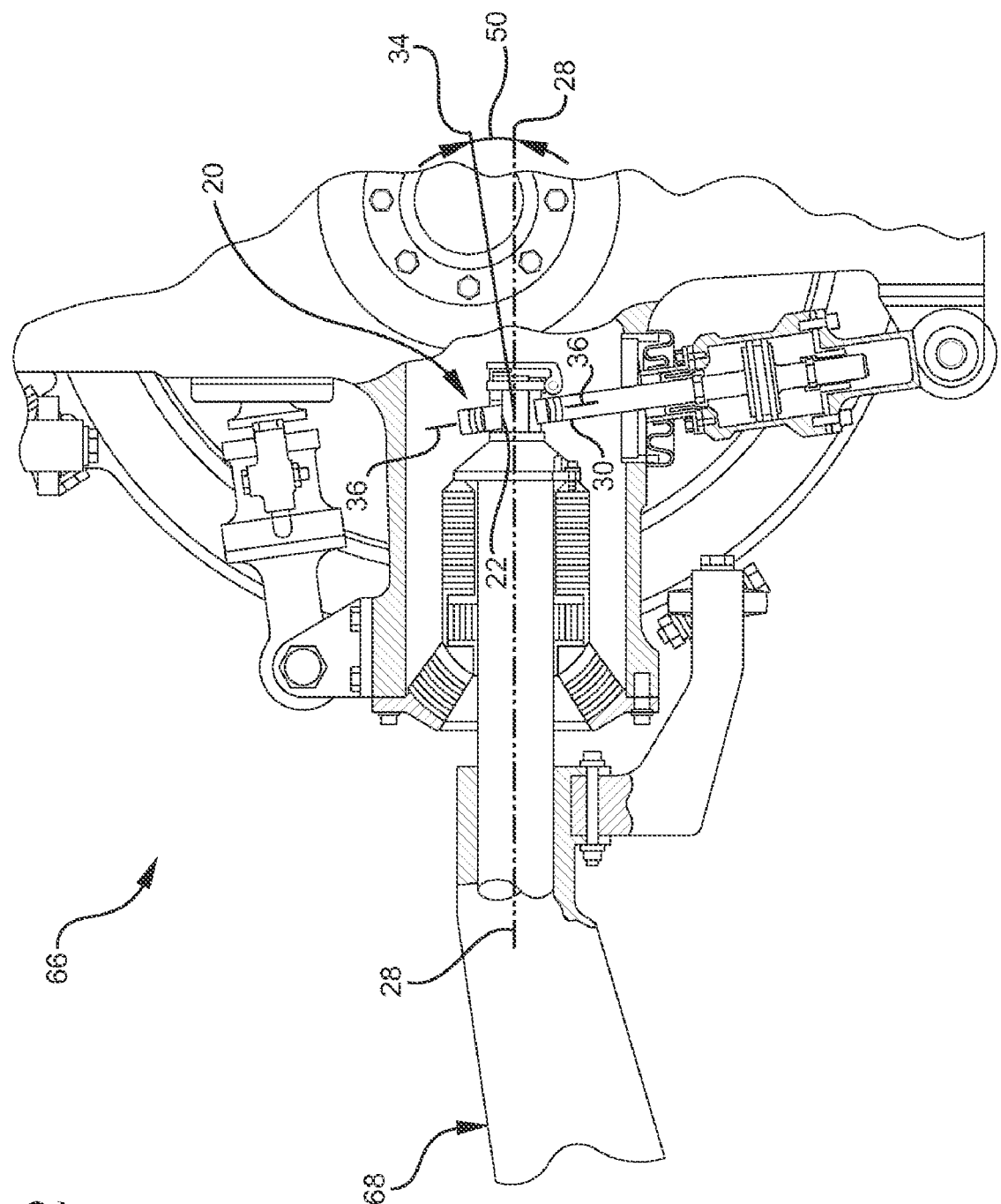
FIG. 12 shows a rotary wing aircraft rod end installed in a rotary wing helicopter.
Figure 13:
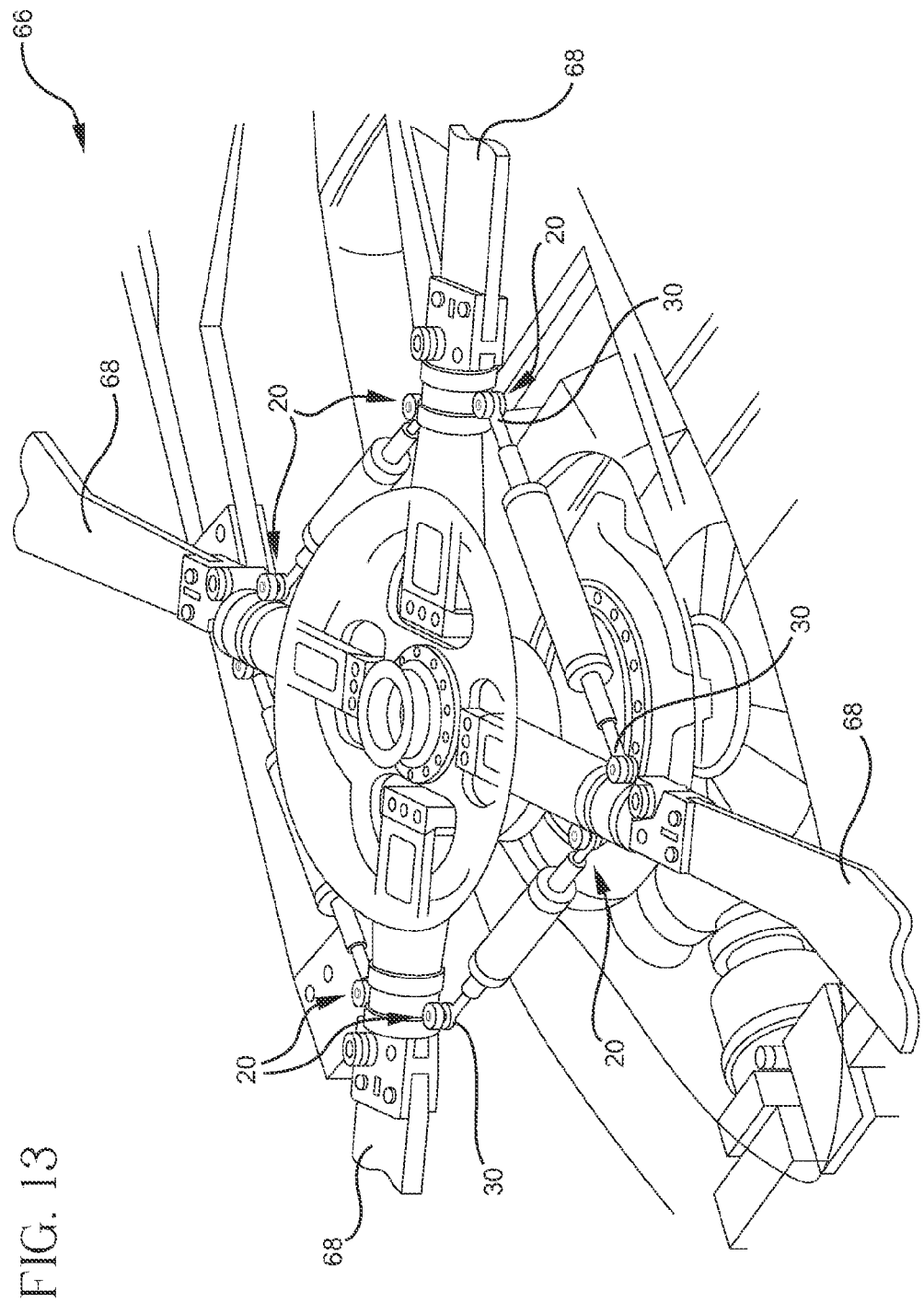
FIG. 13 shows rotary wing rod ends installed in a helicopter vehicle.
Figure 14:
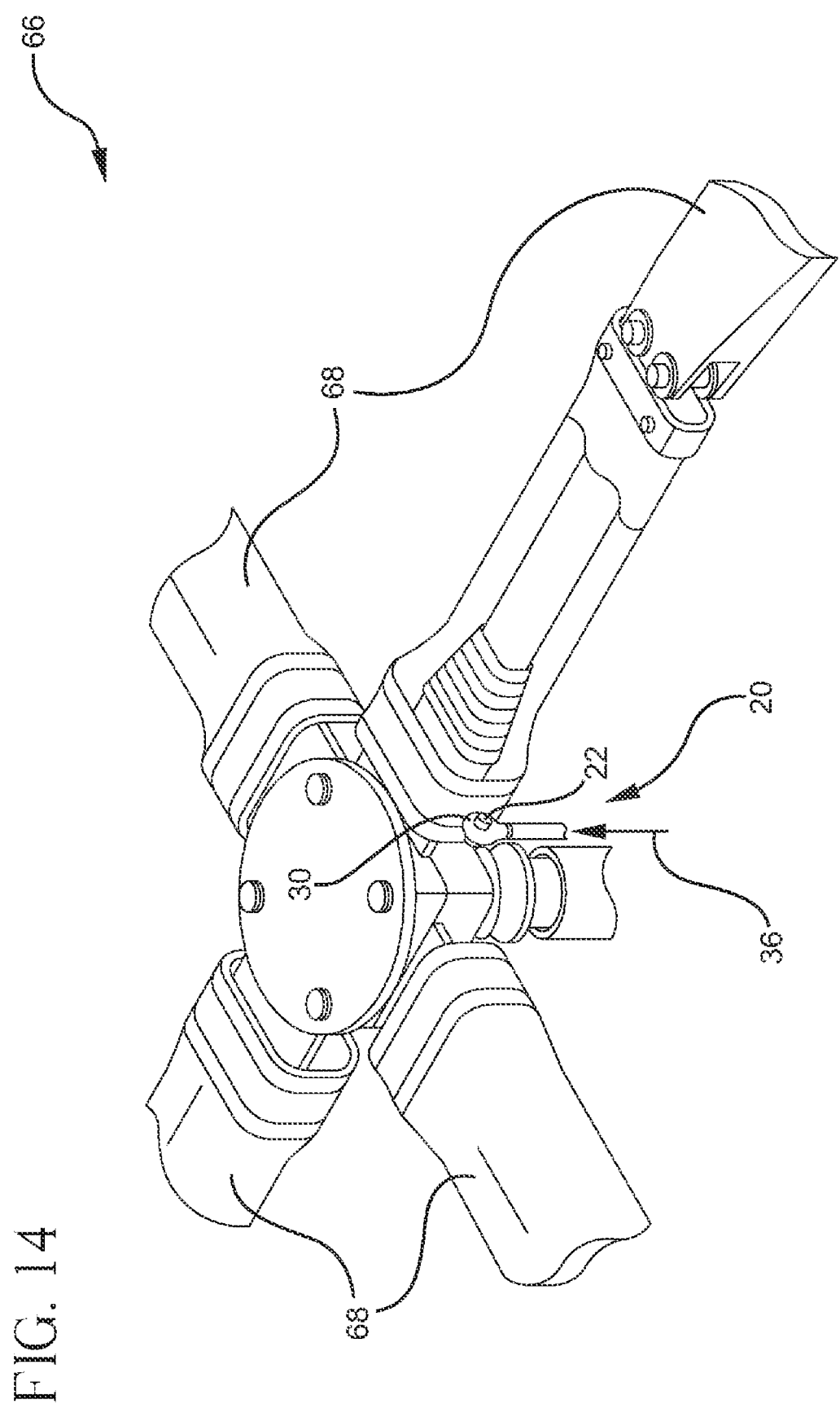
FIG. 14 shows a rotary wing vehicular rod end installed in an aircraft.
Figure 15:
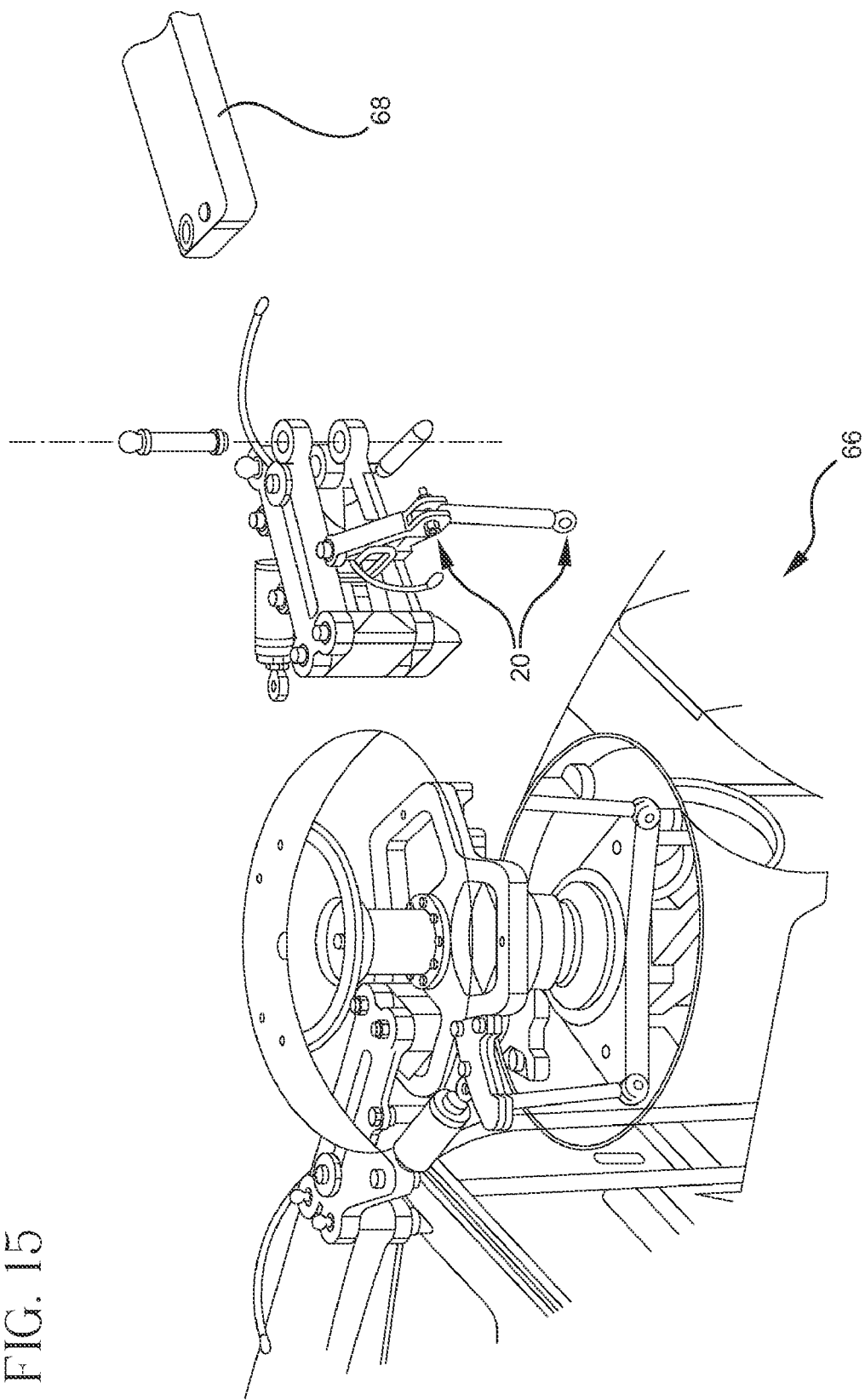
FIG. 15 shows vehicular rod ends installed in a helicopter.

FIG. 4 shows an enlarged view of a cross section of a rod end with the nonelastomeric inner member 22 misaligned and received inside the outer member with the inner member having a precooked orientation. The nonelastomeric shims 40 and the elastomer 38 are disposed between the precooked inner member and the outer member. FIG. 5 shows an inner member 22 with its outer bonding surface 24 and axial bore 26. FIG. 6 shows a rod end with its shims 40 having shim split divisions 41. FIG. 7 further shows a rod end, with an exploded view illustrating the inner member 22 and the shims 40 received inside the outer member 30. FIG. 8 shows a rod end with the inner member precooked and the alternating shims 40 having their shim split divisions 41 oriented nonoverlapping. FIG. 9 shows a cross section of a rod end and illustrates the inner member precooked relative to the outer member. FIG. 10 shows an enlarged section of the rod end shown in FIG. 9. FIG. 11 shows a method of making the precooked rod end with the inner member and outer member received inside a rod end mold. FIG. 12-15 show precooked rod ends installed in rotary wing aircraft.

FIG. 11 shows a method of making a precooked orientation rod end 20. The nonelastomeric outer member 30 is received inside the mold with the nonelastomeric inner member 22 misaligned and received inside the outer member with the inner member having a precooked orientation. Inside the rod end mold in addition to the inner member and the outer member, the nonelastomeric shims 40 are received in misalignment grooves between the inner and outer member with the misalignment grooves orienting the nonelastomeric shims 40 relative to the inner member and the outer member.

In an embodiment the invention includes a method of making a rod end 20. The method includes providing a nonelastomeric inner member 22 having an outer bonding surface segment 24 and an axial bore 26 with a center bore axis 28. Preferably the nonelastomeric inner member 22 is comprised of a metal. Preferably the outer bonding surface segment 24 is spherical. The method includes providing a nonelastomeric outer member 30 having an inner bonding surface segment 32 and an axial bore with an axial bore center bore axis 34, preferably with the axial bore center bore axis 34 normal to rod shaft axis 36. Preferably the nonelastomeric outer member 30 is comprised of a metal. Preferably the inner bonding surface segment 32 is spherical. The method includes providing a plurality of elastomeric shims 38 and nonelastomeric shims 40, including a first inner elastomeric shim 42, a first inner nonelastomeric shim 44, a second outer elastomeric shim 46, and a second outer nonelastomeric shim 48. Preferably the nonelastomeric shims 40 are comprised of metal. The method includes providing a rod end mold 60 for receiving the nonelastomeric inner member 22 and the nonelastomeric outer member 30 with the nonelastomeric inner member 22 held in the nonelastomeric outer member axial bore 33. The method includes molding the nonelastomeric inner member 22 to the nonelastomeric outer member 30 with the plurality of elastomeric shims 38 and nonelastomeric shims 40 wherein the nonelastomeric inner member 22 has a molded in place misalignment orientation 50 with the outer nonelastomeric outer member 30, with the nonelastomeric inner member axial bore center bore axis 28 nonparallel with the nonelastomeric outer member axial bore center bore axis 34, preferably with the inner member axial bore center bore axis 28 nonnormal to the rod shaft axis 36. Preferably the nonparallel misaligned axis 34 and axis 28 intersect within the inner member 22, most preferably also intersecting with the rod shaft axis 36. Preferably molding the nonelastomeric inner member 22 to the nonelastomeric outer member 30 with the plurality of elastomeric shims 38 and nonelastomeric shims 40 includes molding with a misalignment angle 50 greater than one degree between the nonelastomeric inner member axial bore center bore axis 28 and the nonelastomeric outer member axial bore center bore axis 34. Preferably molding the nonelastomeric inner member 22 to the nonelastomeric outer member 30 with the plurality of elastomeric shims 38 and nonelastomeric shims 40 includes molding with a misalignment angle 50 greater than 2 degrees, preferably <20 degrees. Preferably molding the nonelastomeric inner member 22 to the nonelastomeric outer member 30 with the plurality of elastomeric shims 38 and nonelastomeric shims 40 includes molding with a misalignment angle 50 in the range of 2-20 degrees, preferably 3-15 degrees, preferably 4-8 degrees. Preferably molding the nonelastomeric inner member 22 to the nonelastomeric outer member 30 with the plurality of elastomeric shims 38 and nonelastomeric shims 40 includes molding with a misalignment angle 50 in the range of 5±3 degrees, preferably 5±2 degrees, preferably 5±1 degrees. Preferably the shims are spherical shell segment shims 40, preferably with progressively larger circumferences from the inner to the outer shim, preferably the shims 40 are nonextensible metal shims 40, preferably with the shims 40 comprised of spherical shell segments, most preferably split spherical shell halves 39 separated by shim split divisions 41 with adjacent shims 40 having their spherical shell half split divisions 41 clocked in a nonoverlapping orientation 43. Preferably the method includes bonding the first inner elastomeric shim 42 to the nonelastomeric inner member outer bonding surface segment 24 and to the first inner nonelastomeric shim 44 and bonding the second outer elastomeric shim 46 to the nonelastomeric outer member inner bonding surface segment 32 and to the second outer nonelastomeric shim 48, most preferably bonding with a chemical bonding adhesive, preferably then vulcanization curing in pressurized rubber mold 60. Preferably bonding includes bonding a third elastomeric shim 38 between the first inner nonelastomeric shim 44 and the second outer nonelastomeric shim 48, most preferably with bonding at least a fourth alternating elastomeric shim 38 and nonelastomeric shim 40 between the first inner nonelastomeric shim 44 and the second outer nonelastomeric shim 48. In a further embodiment at least a fifth alternating elastomeric shim 38 and nonelastomeric shim 40 are bonded between the first inner nonelastomeric shim 44 and the second outer nonelastomeric shim 48. In a further embodiment at least a sixth alternating elastomeric shim 38 and nonelastomeric shim 40 are bonded between the first inner nonelastomeric shim 44 and the second outer nonelastomeric shim 48. In a further embodiment at least a seventh alternating elastomeric shim 38 and nonelastomeric shim 40 are bonded between the first inner nonelastomeric shim 44 and the second outer nonelastomeric shim 48. Preferably the method includes molding in place the first inner nonelastomeric shim 44 with a precooking orientation angle 52 relative to the nonelastomeric outer member axial bore center bore axis 34. Preferably the method includes molding in place the second outer nonelastomeric shim 48 with a precooking orientation angle 54 relative to the nonelastomeric outer member axial bore center bore axis 34, with the first inner nonelastomeric shim precooking orientation angle 52 greater than the second outer nonelastomeric shim precooking orientation angle 54. Preferably the method includes progressively cocking shims 40 from outer to inner, preferably with at least a half degree precooking orientation angle per shim, most preferably with less than five degrees precooking orientation angle per shim. Preferably molding includes providing an elastomer transfer stock 62, and transferring the elastomer transfer stock 62 under a pressure into the rod end mold 60, such as through a sprue with the mold comprising close fitting steel metal pieces clamped in place, and vulcanizing curing the elastomers 56 inside the mold 60 under a molding pressure of at least 1000 psi, preferably at least 1500 psi, and more preferably at least 2000 psi. Preferably providing the rod end mold 60 includes providing a plurality of concentric misalignment grooves 64, the mold misalignment grooves 64 for receiving and orienting the nonelastomeric shims 40 at their precooking orientation angle relative to the axial bore center bore axis 34 and the inner member 22 and its center bore axis 28. This invention provides for elastomeric rod ends pre-cocked shim layer-by-layer during molding to attain large cocking offset between inner and outer members without leaving any one shim layer severely over hung. The invention provides progressive cocking in each alternating elastomeric nonelastomeric layer. Cocking in every layer is preferably provided by the mold progressively cocking each shim misalignment groove, which are preferably formed in the mold with a metal removal process to form the shim misalignment groove in the metal of the mold, such as high-speed end mills cutting each shim mold groove.

In an embodiment the invention includes making a rod end 20 by providing a nonelastomeric metal inner member 22 having an outer bonding surface segment 24 and an axial bore 26 with a center bore axis 28, providing a nonelastomeric metal outer member 30 having an inner bonding surface segment 32 and an axial bore with an axial bore center bore axis 34, providing a plurality of shims 40, including a first inner shim 44 and a second outer shim 48, providing a rod end mold 60 for receiving said nonelastomeric inner member 22 and said nonelastomeric outer member 30 with said nonelastomeric inner member 22 held in said nonelastomeric outer member axial bore 33, and molding said nonelastomeric inner member 22 to said nonelastomeric outer member 30 with said plurality of shims 40 wherein said nonelastomeric inner member 22 has a molded in place misalignment orientation 50 with the outer nonelastomeric outer member 30, with the nonelastomeric inner member axial bore center bore axis 28 nonparallel with the nonelastomeric outer member axial bore center bore axis 34. Preferably the nonelastomeric inner member 22 is comprised of a metal. Preferably the outer bonding surface segment 24 is spherical. Preferably the nonelastomeric outer member 30 is comprised of a metal. Preferably the inner bonding surface segment 32 is spherical. Preferably the nonelastomeric shims 40 are comprised of metal. Preferably molding the nonelastomeric inner member 22 to the nonelastomeric outer member 30 with the plurality of shims includes molding with a misalignment angle 50 greater than one degree between the nonelastomeric inner member axial bore center bore axis 28 and the nonelastomeric outer member axial bore center bore axis 34. Preferably molding the nonelastomeric inner member 22 to the nonelastomeric outer member 30 with the plurality of nonelastomeric shims 40 includes molding with a misalignment angle 50 greater than 2 degrees, preferably <20 degrees. Preferably molding the nonelastomeric inner member 22 to the nonelastomeric outer member 30 with the plurality of shims includes molding with a misalignment angle 50 in the range of 2-20 degrees, preferably 3-15 degrees, preferably 4-8 degrees. Preferably molding the nonelastomeric inner member 22 to the nonelastomeric outer member 30 with the plurality of shims includes molding with a misalignment angle 50 in the range of 5±3 degrees, preferably 5±2 degrees, preferably 5±1 degrees. Preferably the shims are spherical shell segment shims 40, preferably with progressively larger circumferences from the inner to the outer shim, preferably the shims 40 are nonextensible metal shims 40, preferably with the shims 40 comprised of spherical shell segments, most preferably split spherical shell halves 39 separated by shim split divisions 41 with adjacent shims 40 having their spherical shell half split divisions 41 clocked in a nonoverlapping orientation 43. Preferably the method includes molding in place the first inner nonelastomeric shim 44 with a precooking orientation angle 52 relative to the nonelastomeric outer member axial bore center bore axis 34. Preferably the method includes molding in place the second outer nonelastomeric shim 48 with a precooking orientation angle 54 relative to the nonelastomeric outer member axial bore center bore axis 34, with the first inner nonelastomeric shim precooking orientation angle 52 greater than the second outer nonelastomeric shim precooking orientation angle 54. Preferably the method includes progressively cocking shims 40 from outer to inner, preferably with at least a half degree precooking orientation angle per shim, most preferably with less than five degrees precooking orientation angle per shim. Preferably molding includes providing an elastomer transfer stock 62, and transferring the elastomer transfer stock 62 under a pressure into the rod end mold 60, such as through a sprue with the mold comprising close fitting steel metal pieces clamped in place, and vulcanizing curing the elastomer 56 inside the mold 60 under a molding pressure of at least 1000 psi, preferably at least 1500 psi, and more preferably at least 2000 psi. Preferably providing the rod end mold 60 includes providing a plurality of concentric misalignment grooves 64, the mold misalignment grooves 64 for receiving and orienting the nonelastomeric shims 40 at their precooking orientation angle relative to the axial bore center bore axis 34 and the inner member 22 and its center bore axis 28.

In an embodiment the invention includes a rotary wing aircraft helicopter vehicle rod end 20 for a rotary wing aircraft helicopter vehicle 66 with a rotary wing 68. The rotary wing aircraft rod end 20 is comprised of a nonelastomeric metal inner member 22 having an outer bonding surface segment and an axial bore with a center bore axis 28, a nonelastomeric outer member 30 having an inner bonding surface segment and an axial bore center bore axis 34 normal to the rod shaft axis 36, and a plurality of molded in place alternating elastomeric shims 38 and nonelastomeric shims 40 connecting the nonelastomeric inner member 22 to said nonelastomeric outer member 30 including a first inner elastomeric shim 42 bonded to the nonelastomeric inner member outer bonding surface segment 24 and to a first inner nonelastomeric shim 44 and a second outer elastomeric shim 46 bonded to the nonelastomeric outer member inner bonding surface segment 32 and to a second outer nonelastomeric shim 48 wherein the nonelastomeric inner member 22 has a molded misalignment rotary wing aircraft helicopter vehicle rod end orientation 50 with the outer nonelastomeric outer member 30 with the nonelastomeric inner member axial bore center bore axis 28 nonparallel with the nonelastomeric outer member axial bore center bore axis 34. Preferably the inner member axial bore center bore axis 28 is nonnormal to the rod shaft axis 36. Preferably the axes intersect within the inner member 22. Preferably the inner member outer bonding surface segment 24 is a spherical surface segment 24. Preferably the rotary wing aircraft rod end outer member 30 is a nonextensible metal outer member 30. Preferably the outer member inner bonding surface segment 32 is a spherical surface segment 32. Preferably the rotary wing aircraft rod end axial bore center bore axis 34 is normal to the rotary wing aircraft rod end rod shaft axis 36. Preferably the nonelastomeric shims 40 are nonextensible metal shims 40, preferably with the shims 40 comprised of spherical shell segments, most preferably split spherical shell halves 39 separated by shim split divisions 41 with adjacent shims 40 having their spherical shell half split divisions 41 in a clocked nonoverlapping orientation 43. The rotary wing aircraft rod end 20 has an uninstalled molded misalignment orientation 50 in that the misalignment is molded into place with the misalignment existing prior to installation in rotary wing aircraft 66, preferably with the inner member axial bore center bore axis 28 nonnormal to the rod shaft axis 36, with the axes intersecting within the inner member bore 26. Preferably the first inner nonelastomeric shim 44 has a precooking orientation angle 52 with the rotary wing aircraft rod end nonelastomeric outer member axial bore center bore axis 34. More preferably the second outer nonelastomeric shim 48 has a precooking orientation angle 54 with the nonelastomeric outer member axial bore center bore axis 34, with the first inner nonelastomeric shim precooking orientation angle 52 greater than the second outer nonelastomeric shim precooking orientation angle 54, most preferably with a progressive cocking of the shims 40 from the outer to the inner nonelastomeric member. Preferably the shims 40 are progressively cocking shims with at least a half degree of cocking orientation per shim. Preferably the shims 40 are progressively cocking shims with less than five degrees per shim. Preferably the rotary wing aircraft rod end misalignment angle orientation 50 of the inner member 22 is greater than one degree between the nonelastomeric inner member axial bore center bore axis 28 and the nonelastomeric outer member axial bore center bore axis 34, more preferably in a range of 2-20 degrees, more preferably >2 degrees, more preferably in a range of 3-15 degrees, preferably 4-8, preferably 5±3, preferably 5±2, preferably 5±1. In preferred embodiments the rotary wing aircraft rod end 20 has a plurality of alternating elastomeric and nonelastomeric shims and preferably includes a third nonelastomeric shim 40 between the first inner nonelastomeric shim 44 and the second outer nonelastomeric shim 48, preferably at least a fourth nonelastomeric shim 40 between the first and second shims, preferably at least a fifth nonelastomeric shim 40 between the first and second shims, preferably at least a sixth nonelastomeric shim 40 between the first and second shims, and preferably a seventh nonelastomeric shim 40. Preferably the elastomeric shims 38 are contained between the nonelastomeric inner member 22, the nonelastomeric outer member 30, and the nonelastomeric shims 40. Preferably the elastomer 56 does not extend beyond the edges of shims 40, the edges of the members 22 and 30, preferably with the elastomeric shims 38 having a nonextending outer surface 58 between shims 40 and inner and outer members 22 and 30.

In an embodiment the invention includes making a rotary wing aircraft helicopter vehicular rod end 20. The method includes providing a rotary wing vehicular rod end nonelastomeric inner member 22 having an outer bonding surface segment 24 and an axial bore 26 with a center bore axis 28. The method includes providing a rotary wing vehicular rod end nonelastomeric outer member 30 having an inner bonding surface segment 32 and an axial bore 33 with an axial bore center bore axis 34, preferably normal to a rod shaft axis 36. Preferably the nonelastomeric outer member 30 is comprised of a metal. Preferably the inner bonding surface segment 32 is spherical. The method includes providing a plurality of elastomeric shims 38 and nonelastomeric shims 40, including a first inner elastomeric shim 42, a first inner nonelastomeric shim 44, a second outer elastomeric shim 46, and a second outer nonelastomeric shim 48. Preferably the nonelastomeric shims 40 are comprised of metal. The method includes providing a rod end mold 60 for receiving the nonelastomeric inner member 22 and the nonelastomeric outer member 30 with the nonelastomeric inner member 22 held in the nonelastomeric outer member axial bore 33. The method includes molding the nonelastomeric inner member 22 to the nonelastomeric outer member 30 with the plurality of elastomeric shims 38 and nonelastomeric shims 40 wherein the nonelastomeric inner member 22 has a molded in place misalignment orientation 50 with the outer nonelastomeric outer member 30, with the nonelastomeric inner member axial bore center bore axis 28 nonparallel with the nonelastomeric outer member axial bore center bore axis 34, preferably with the inner member axial bore center bore axis 28 nonnormal to the rod shaft axis 36. Preferably the nonparallel misaligned axis 34 and axis 28 intersect within the inner member 22, most preferably also intersecting with the rod shaft axis 36. Preferably molding the nonelastomeric inner member 22 to the nonelastomeric outer member 30 with the plurality of elastomeric shims 38 and nonelastomeric shims 40 includes molding with a misalignment angle 50 greater than one degree between the nonelastomeric inner member axial bore center bore axis 28 and the nonelastomeric outer member axial bore center bore axis 34. Preferably molding the nonelastomeric inner member 22 to the nonelastomeric outer member 30 with the plurality of elastomeric shims 38 and nonelastomeric shims 40 includes molding with a misalignment angle 50 greater than 2 degrees, preferably <20 degrees. Preferably molding the nonelastomeric inner member 22 to the nonelastomeric outer member 30 with the plurality of elastomeric shims 38 and nonelastomeric shims 40 includes molding with a misalignment angle 50 in the range of 2-20 degrees, preferably 3-15 degrees, preferably 4-8 degrees. Preferably molding the nonelastomeric inner member 22 to the nonelastomeric outer member 30 with the plurality of elastomeric shims 38 and nonelastomeric shims 40 includes molding with a misalignment angle 50 in the range of 5±3 degrees, preferably 5±2 degrees, preferably 5±1 degrees. Preferably the shims are spherical shell segment shims 40, preferably with progressively larger circumferences from the inner to the outer shim, preferably the shims 40 are nonextensible metal shims 40, preferably with the shims 40 comprised of spherical shell segments, most preferably split spherical shell halves 39 separated by shim split divisions 41 with adjacent shims 40 having their spherical shell half split divisions 41 clocked in a nonoverlapping orientation 43. Preferably the method includes bonding the first inner elastomeric shim 42 to the nonelastomeric inner member outer bonding surface segment 24 and to the first inner nonelastomeric shim 44 and bonding the second outer elastomeric shim 46 to the nonelastomeric outer member inner bonding surface segment 32 and to the second outer nonelastomeric shim 48, most preferably bonding with a chemical bonding adhesive, preferably then vulcanization curing in pressurized rubber mold 60. Preferably bonding includes bonding a third elastomeric shim 38 between the first inner nonelastomeric shim 44 and the second outer nonelastomeric shim 48, most preferably with bonding at least a fourth alternating elastomeric shim 38 and nonelastomeric shim 40 between the first inner nonelastomeric shim 44 and the second outer nonelastomeric shim 48. In a further embodiment at least a fifth alternating elastomeric shim 38 and nonelastomeric shim 40 are bonded between the first inner nonelastomeric shim 44 and the second outer nonelastomeric shim 48. In a further embodiment at least a sixth alternating elastomeric shim 38 and nonelastomeric shim 40 are bonded between the first inner nonelastomeric shim 44 and the second outer nonelastomeric shim 48. In a further embodiment at least a seventh alternating elastomeric shim 38 and nonelastomeric shim 40 are bonded between the first inner nonelastomeric shim 44 and the second outer nonelastomeric shim 48. Preferably the method includes molding in place the first inner nonelastomeric shim 44 with a precooking orientation angle 52 relative to the nonelastomeric outer member axial bore center bore axis 34. Preferably the method includes molding in place the second outer nonelastomeric shim 48 with a precooking orientation angle 54 relative to the nonelastomeric outer member axial bore center bore axis 34, with the first inner nonelastomeric shim precooking orientation angle 52 greater than the second outer nonelastomeric shim precooking orientation angle 54. Preferably the method includes progressively cocking shims 40 from outer to inner, preferably with at least a half degree precooking orientation angle per shim, most preferably with less than five degrees precooking orientation angle per shim. Preferably molding includes providing an elastomer transfer stock 62, and transferring the elastomer transfer stock 62 under a pressure into the rod end mold 60, such as through a sprue with the mold comprising close fitting steel metal pieces clamped in place, and vulcanizing curing the elastomers 56 inside the mold 60 under a molding pressure of at least 1000 psi, preferably at least 1500 psi, and more preferably at least 2000 psi. Preferably providing the rotary wing vehicular rod end mold 60 includes providing a plurality of concentric misalignment grooves 64, the mold misalignment grooves 64 for receiving and orienting the nonelastomeric shims 40 at their precooking orientation angle relative to the axial bore center bore axis 34 and the inner member 22 and its center bore axis 28.

It will be apparent to those skilled in the art that various modifications and variations can be made to the invention without departing from the spirit and scope of the invention. Thus, it is intended that the invention cover the modifications and variations of this invention provided they come within the scope of the appended claims and their equivalents.

It is intended that the scope of differing terms or phrases in the claims may be fulfilled by the same or different structure(s) or step(s).

The invention claimed is:

1. A method of making a vehicular rod end, said method comprising:
   providing a nonelastomeric inner member having an outer bonding surface segment and an axial bore with a center bore axis, providing a nonelastomeric outer member having an inner bonding surface segment and an axial bore with an axial bore center bore axis, providing a plurality of nonelastomeric shims, including a first inner nonelastomeric shim, and a second outer nonelastomeric shim, providing a rod end mold for receiving said nonelastomeric inner member and said nonelastomeric outer member with said nonelastomeric inner member held in said nonelastomeric outer member axial bore with said nonelastomeric shims disposed between said nonelastomeric outer member and said nonelastomeric inner member, said rod end mold including a means for misaligning said outer nonelastomeric outer member with said nonelastomeric inner member, providing a curable elastomer, molding said nonelastomeric inner member to said nonelastomeric outer member with said elastomer under an applied elastomer pressure inside said mold and curing said elastomer wherein said nonelastomeric inner member has a molded misalignment orientation with the outer nonelastomeric outer member with the nonelastomeric inner member axial bore center bore axis nonparallel with the nonelastomeric outer member axial bore center bore axis.

2. A method as claimed in claim 1 wherein molding said nonelastomeric inner member to said nonelastomeric outer member includes molding with a misalignment angle greater than one degree between the nonelastomeric inner member axial bore center bore axis and the nonelastomeric outer member axial bore center bore axis.

3. A method as claimed in claim 1 wherein said nonelastomeric shims are a plurality of spherical shell segments with progressively larger circumferences.

4. A method as claimed in claim 1 wherein said first inner nonelastomeric shim has a precocking orientation angle with said nonelastomeric outer member axial bore center bore axis.

5. A method as claimed in claim 4 wherein said second outer nonelastomeric shim has a precocking orientation angle with said nonelastomeric outer member axial bore center bore axis, with said first inner nonelastomeric shim precocking orientation angle greater than said second outer nonelastomeric shim precocking orientation angle.

6. A method of making a rod end, said method comprising: providing a nonelastomeric inner member having an outer bonding surface segment and an axial bore with a center bore axis, providing a nonelastomeric outer member having an inner bonding surface segment and an axial bore with an axial bore center bore axis, providing a plurality of elastomeric shims and nonelastomeric shims, including a first inner elastomeric shim, a first inner nonelastomeric shim, a second outer elastomeric shim, and a second outer nonelastomeric shim, providing a rod end mold for receiving said nonelastomeric inner member and said nonelastomeric outer member with said nonelastomeric inner member held in said nonelastomeric outer member axial bore, molding said nonelastomeric inner member to said nonelastomeric outer member with said plurality of elastomeric shims and nonelastomeric shims with said molding including providing an elastomer transfer stock and transferring said elastomer transfer stock under a pressure into said rod end mold wherein said nonelastomeric inner member has a molded misalignment orientation with the outer nonelastomeric outer member with the nonelastomeric inner member axial bore center bore axis nonparallel with the nonelastomeric outer member axial bore center bore axis.

7. A method as claimed in claim 6 wherein molding said nonelastomeric inner member to said nonelastomeric outer member with said plurality of elastomeric shims and nonelastomeric shims includes molding with a misalignment angle greater than one degree between the nonelastomeric inner member axial bore center bore axis and the nonelastomeric outer member axial bore center bore axis.

8. A method as claimed in claim 6 wherein said nonelastomeric shims are spherical shell segment shims.

9. A method as claimed in claim 6 including bonding said first inner elastomeric shim to the nonelastomeric inner member outer bonding surface segment and to said first inner nonelastomeric shim and bonding said second outer elastomeric shim to the nonelastomeric outer member inner bonding surface segment and to said second outer nonelastomeric shim.

10. A method as claimed in claim 9 including bonding a third elastomeric shim between said first inner nonelastomeric shim and said second outer nonelastomeric shim.

11. A method as claimed in claim 6 wherein said first inner nonelastomeric shim has a precocking orientation angle with said nonelastomeric outer member axial bore center bore axis.

12. A method as claimed in claim 11 wherein said second outer nonelastomeric shim has a precocking orientation angle with said nonelastomeric outer member axial bore center bore axis, with said first inner nonelastomeric shim precocking orientation angle greater than said second outer nonelastomeric shim precocking orientation angle.

13. A method of making a rod end, said method comprising: providing a nonelastomeric inner member having an outer bonding surface segment and an axial bore with a center bore axis, providing a nonelastomeric outer member having an inner bonding surface segment and an axial bore with an axial bore center bore axis, providing a plurality of elastomeric shims and nonelastomeric shims, including a first inner elastomeric shim, a first inner nonelastomeric shim, a second outer elastomeric shim, and a second outer nonelastomeric shim, providing a rod end mold for receiving said nonelastomeric inner member and said nonelastomeric outer member with said nonelastomeric inner member held in said nonelastomeric outer member axial bore with said mold including a means for misaligning, molding said nonelastomeric inner member to said nonelastomeric outer member with said plurality of elastomeric shims and nonelastomeric shims wherein said nonelastomeric inner member has a molded misalignment orientation with the outer nonelastomeric outer member with the nonelastomeric inner member axial bore center bore axis nonparallel with the nonelastomeric outer member axial bore center bore axis.

* * * * *